Aug. 18, 1959  A. C. SYNSTEGARD  2,900,170
CABLE LAYING DEVICE
Filed Aug. 6, 1958  2 Sheets-Sheet 1
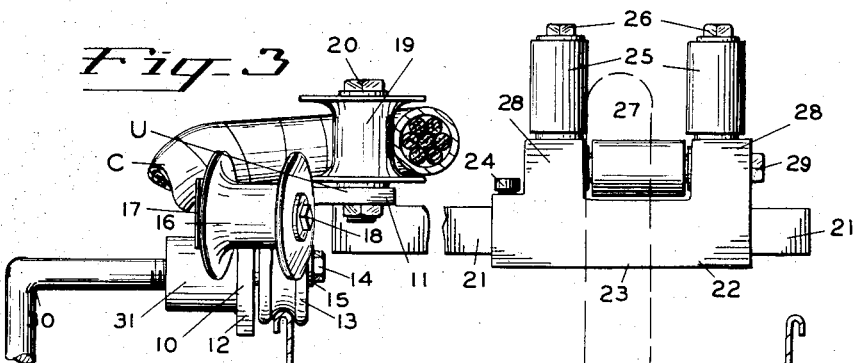
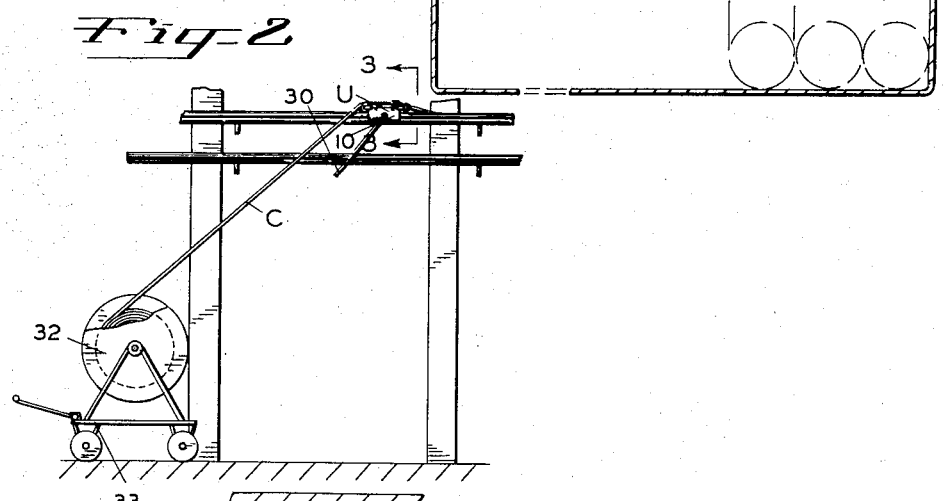
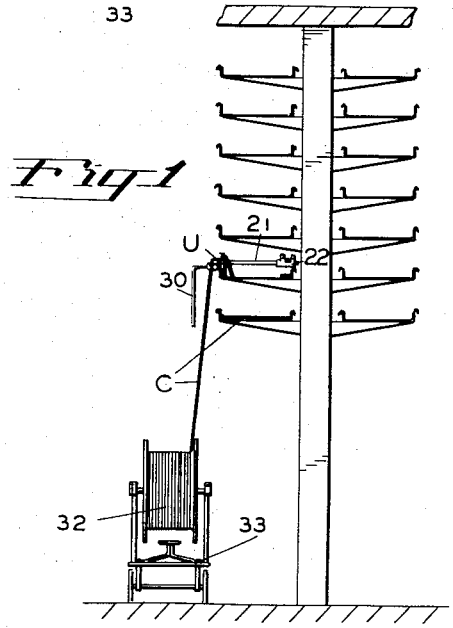
*INVENTOR.*
ALFRED C. SYNSTEGARD
BY
*Kimmel & Crowell*
ATTORNEYS

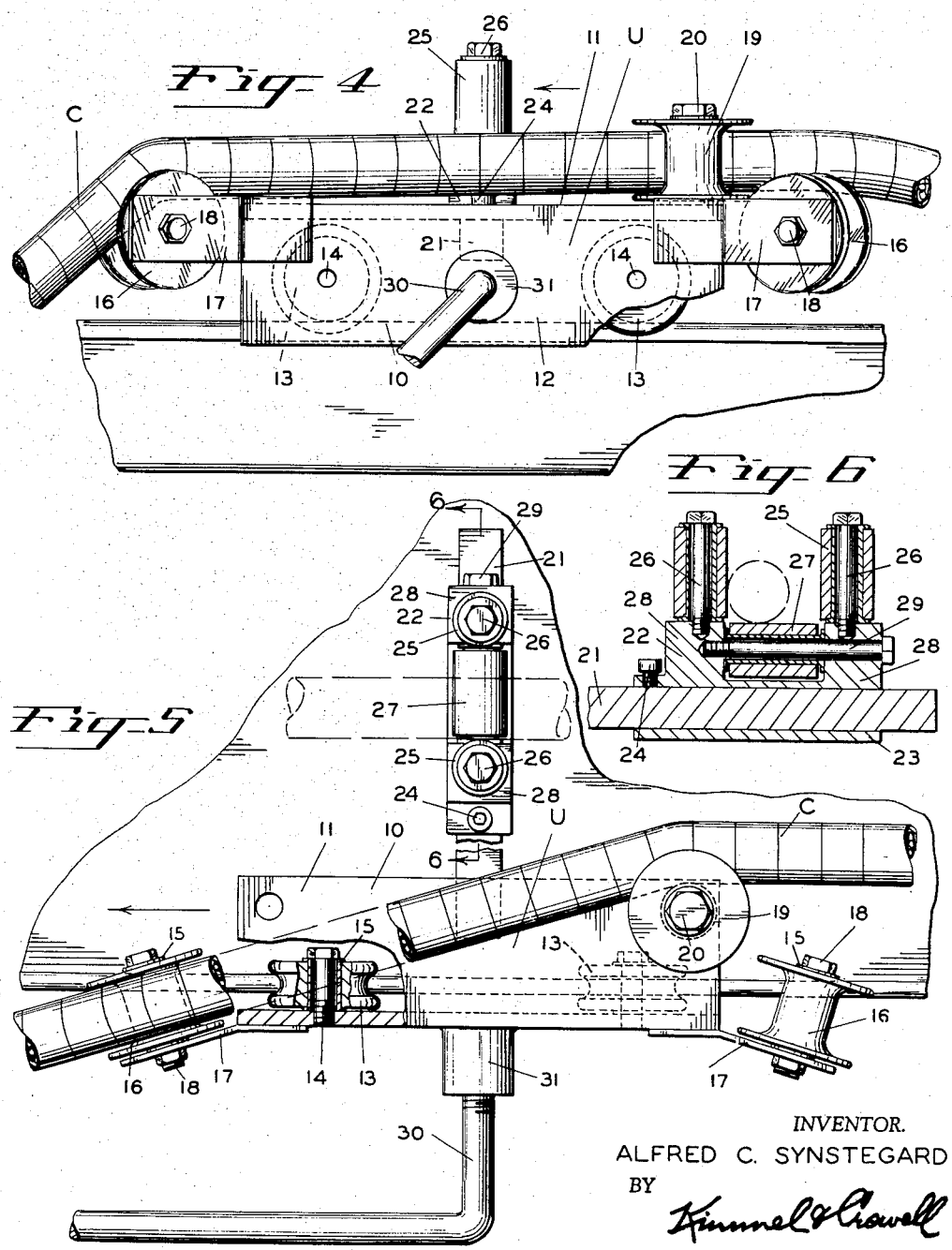

2,900,170

CABLE LAYING DEVICE

Alfred C. Synstegard, Lyle, Wash.

Application August 6, 1958, Serial No. 753,575

5 Claims. (Cl. 254—134.3)

The present invention relates to a cable laying device for laying and positioning electric cables on cable supporting trays located in dams, power plants and the like.

The primary object of the invention is to provide a cable laying device which removes the cable from reels and places the same on the trays used for supporting cables.

A further object of the invention is to provide in a cable laying device a means for aligning the cable within the trays after it has been placed therein. Usually trays for holding and supporting cables in power houses, dams and the like are supported on vertical supports, such as posts or walls, one tray spaced above the other.

Heretofore, it took several men considerable time to raise the cables into the trays and to position the same. With the present invention a minimum of labor is required in the placing of the cables in the trays and for aligning the cables within the trays in their proper position.

Other objects and advantages will become apparent in the following specification when considered in the light of the attached drawings, in which:

Figure 1 is a transverse sectional view of the invention in use on a battery of trays mounted upon supporting posts, illustrating the position of the reel of cable relative to the trays when placing the cable into the trays.

Figure 2 is a fragmentary side view of the structure shown in Figure 1.

Figure 3 is a fragmentary transverse sectional view, taken on the line 3—3 of Figure 2, looking in the direction of the arrows.

Figure 4 is a fragmentary enlarged side view of the cable laying device, looking into the side of the tray, partially broken away for convenience of illustration.

Figure 5 is a fragmentary plan view of the structure shown in Figure 4, with parts broken away for convenience of illustration.

Figure 6 is a fragmentary sectional view, taken on the line 6—6 of Figure 5, looking in the direction of the arrows.

Referring now to the drawings in detail wherein like reference characters indicate like parts throughout the several figures, the reference character U indicates generally a cable laying unit constructed in accordance with the invention.

Located in power plants, dams and other electric supply stations, there are many electric cables carried by supporting trays. These trays are usually spaced apart, one above the other on posts or walls. In order to get the cables in these trays, it required a number of men to lift the cable up into the trays, and after placing them in the trays it required considerable effort to align the cables along side one another in the tray. With this new and improved cable laying unit U, the same can be done by one or two men. The unit U includes a frame 10, having an upper horizontal platform 11 and a depending vertical side frame 12. Journalled to the side frame 12 are trunnion wheels 13 carried by bolts 14.

Surrounding the bolts 14, providing a bearing and a spacer for the wheels 13, are sleeves 15. When the bolts 14 are tightened into the side frame 12, the sleeves 15 are locked securely in place allowing the trunnion wheels 13 to revolve thereon.

Cable guide rollers 16 are rotatably mounted on extension brackets 17 by bolts 18 employing sleeves 15 in the same manner as the wheels 13. Journalled to the platform 11 is a cable guide sheave 19 mounted on a vertical bolt 20. The sheave 19 is adapted to be transferred to either end of the platform 11 depending on which direction the unit U is being operated.

Extending laterally from the frame 10 is a horizontal bar 21 which is fixedly secured to the underside of the platform 11 by welding. Slidably mounted on the horizontal bar 21 is a cable aligning guide 22 which includes a base 23 adapted to slide on the bar 21 and to be locked in position by set screw 24.

Extending vertically upwardly from the base 23 are guide rollers 25 secured thereto by bolts 26. A horizontal roller 27 is journalled between the opposite upwardly extending portions 28 of the base 23 on a bolt 29. An operating handle 30 is threaded within a boss 31, forming part of the side frame 12.

The operation of the unit U for placing cables in trays and aligning the cables in the trays is as follows. The cable C, which is being removed from a reel 32 mounted on a wheeled support 33 is threaded over one of the guide rollers 16, referring particularly to Figures 4 and 5. The cable C is also trained around the cable sheave 19, which guides the same into the tray as the unit U is moved in the direction of the arrow by the operator grasping the handle 30, pulling the same along. Another man moves the cable reel 32 ahead of him.

After the cable C has been placed in the tray, it is necessary to align the same with the cables C already in the tray. This is accomplished by placing the cable C between the guide rollers 25 and over the roller 27, adjusting the base 23 to the proper position on the horizontal supporting bar 21, then by moving the unit U along the tray by the handle 30, the cable C is nested within the tray against the previously laid cables C, making a very economical and simple operation of positioning the cables C in their proper position.

Having thus described the preferred embodiment of the invention, it should be understood that numerous structural modifications and adaptations may be resorted to without departing from the scope of the appended claims.

What is claimed is:

1. A cable laying and aligning device for laying and aligning cables in cable supporting trays of the type having an upright side wall, comprising a frame having a horizontal platform and an integral depending side frame secured to one side edge of said platform, a pair of grooved trunnion wheels secured to said side frame in underlying relation with respect to said platform on horizontally extending journal bolts, angularly offset brackets secured to each end of said side frame and extending angularly therefrom oppositely of said platform, a cable guide roller positioned adjacent each of said offset brackets, a bolt securing each of said cable guide rollers to said offset bracket for rotary movement thereon, a cable guide sheave positioned in overlying relation to one end of said platform, a vertically extending journal bolt securing said sheave to said platform for rotary movement thereon, a supporting bar secured to the under side of said platform and extending transversely outwardly therefrom oppositely of the side from which said side frame depends, and laterally adjustable cable guide means rigidly mounted on said support bar and extending upwardly therefrom.

2. A device as claimed in claim 1 wherein a threaded boss is rigidly secured to said side frame, and a unit moving handle is releasably secured to said threaded boss.

3. A device as claimed in claim 1 wherein said cable guide is slidably mounted on said bar and threaded means are provided for locking said guide to said bar.

4. A device as claimed in claim 3 wherein said cable guide includes a pair of spaced apart parallel upstanding rollers journalled on said guide and a horizontal roller journalled on said guide between and below said upstanding rollers.

5. A device as claimed in claim 1 wherein said sheave is adjustably positioned on said platform at either end of said platform to permit movement of said unit in either direction along said tray.

References Cited in the file of this patent

UNITED STATES PATENTS

| | | |
|---|---|---|
| 278,627 | Taaffe et al. | May 29, 1883 |
| 287,509 | Du Bois | Oct. 30, 1883 |
| 446,214 | Wilson | Feb. 10, 1891 |